United States Patent
Romer et al.

(10) Patent No.: US 10,837,979 B2
(45) Date of Patent: Nov. 17, 2020

(54) PIPETTING DEVICE HAVING A DISPLACEABLE PIPETTING CHANNEL HAVING ENLARGED SUPPORTING LOCATION SPACING

(71) Applicant: Hamilton Bonaduz AG, Bonaduz (CH)

(72) Inventors: Hanspeter Romer, Hinwil (CH); Silvio Walpen, Thalwil (CH)

(73) Assignee: Hamilton Bonaduz AG, Bonaduz (CH)

( * ) Notice: Subject to any disclaimer, the term of this patent is extended or adjusted under 35 U.S.C. 154(b) by 73 days.

(21) Appl. No.: 16/315,923

(22) PCT Filed: Jul. 3, 2017

(86) PCT No.: PCT/EP2017/066450
§ 371 (c)(1),
(2) Date: Jan. 7, 2019

(87) PCT Pub. No.: WO2018/007290
PCT Pub. Date: Jan. 11, 2018

(65) Prior Publication Data
US 2019/0257850 A1 Aug. 22, 2019
US 2020/0278371 A9 Sep. 3, 2020

(30) Foreign Application Priority Data
Jul. 7, 2016 (DE) .......................... 10 2016 212 444

(51) Int. Cl.
*G01N 35/10* (2006.01)
(52) U.S. Cl.
CPC ..... *G01N 35/1081* (2013.01); *G01N 35/1065* (2013.01); *G01N 2035/1069* (2013.01); *G01N 2035/1076* (2013.01)
(58) Field of Classification Search
CPC ....... G01N 35/1081; G01N 35/351065; G01N 2035/1069; G01N 2035/1076
(Continued)

(56) References Cited

U.S. PATENT DOCUMENTS 7,976,794 B2 * 7/2011 Trump ................. G01N 35/109
222/52
7,988,934 B2 * 8/2011 Balmer .............. G01N 35/0099
422/501
(Continued)

FOREIGN PATENT DOCUMENTS

DE 10 2010 064 049 6/2012
EP 2410342 1/2012
(Continued)

OTHER PUBLICATIONS

German Search Report Issued in DE 10 2016 212 444.7 dated Jul. 7, 2017.
(Continued)

*Primary Examiner* — Nimeshkumar D Patel
*Assistant Examiner* — Jean F Morello
(74) *Attorney, Agent, or Firm* — Prince Lobel Tye LLP

(57) ABSTRACT

A pipetting apparatus (10) having a guidance frame (12) having a first linear guidance rail (52) and having a second linear guidance rail (56), the first and the second linear guidance rail (52, 56) proceeding parallel to one another along a displacement axis (VL) and being provided at a distance from one another orthogonally to the displacement axis (VL), and having a pipetting channel (14) which extends along a channel axis (K14) that is nonparallel, preferably orthogonal, to the displacement axis (VL) and which is guided displaceably along the displacement axis (VL) with a first bearing component (54) on the first linear guidance rail (52) and with a second bearing component (58) on the second linear guidance rail (56), is characterized in that the first and the second bearing component (54, 58) are arranged with a spacing (A) from one another along the displacement axis (VL).

25 Claims, 6 Drawing Sheets

(58) Field of Classification Search
USPC .................................................... 73/864.24
See application file for complete search history.

(56) References Cited

U.S. PATENT DOCUMENTS

| | | |
|---|---|---|
| 8,900,527 B2 | 12/2014 | D'Amore et al. |
| 9,101,922 B2 | 8/2015 | D'Amore et al. |
| 9,180,447 B2 | 11/2015 | Schlegel et al. |
| 9,244,087 B2 | 1/2016 | D'Amore et al. |
| 2006/0088443 A1 | 4/2006 | Mattila et al. |
| 2012/0186367 A1 | 7/2012 | D'Amore et al. |
| 2013/0233096 A1 | 9/2013 | Schlegel et al. |
| 2015/0096356 A1 | 4/2015 | D'Amore et al. |
| 2015/0309065 A1 | 10/2015 | D'Amore et al. |

FOREIGN PATENT DOCUMENTS

| | | |
|---|---|---|
| JP | 2003028884 | 1/2003 |
| JP | 2004069664 | 3/2004 |
| JP | 2007003339 | 1/2007 |
| WO | 2014041113 | 3/2014 |

OTHER PUBLICATIONS

International Search Report Issued in PCT/EP2017/066450 dated Jan. 11, 2018.

* cited by examiner

PIPETTING DEVICE HAVING A DISPLACEABLE PIPETTING CHANNEL HAVING ENLARGED SUPPORTING LOCATION SPACING

CROSS REFERENCE TO RELATED APPLICATIONS

This application is the National Stage of International Application No. PCT/EP2017/066450, filed on Jul. 3, 2017, which claims priority to German Application No. 10 2016 212 444.7, filed on Jul. 7, 2016. The contents of both applications are hereby incorporated by reference in their entirety.

The present invention relates to a pipetting apparatus having a guidance frame having a first linear guidance rail and having a second linear guidance rail, the first and the second linear guidance rail proceeding parallel to one another along a displacement axis and being provided at a distance from one another orthogonally to the displacement axis, and having a pipetting channel which extends along a channel axis that is nonparallel, preferably orthogonal, to the displacement axis and which is guided displaceably along the displacement axis with a first bearing component on the first linear guidance rail and with a second bearing component on the second linear guidance rail.

A pipetting apparatus of this species is known, for example, from EP 2 410 342 A2. This document discloses a guidance frame having a total of four parallel linear guidance rails, each two of the four guidance rails apparently serving to guide the displacement motion of one pipetting channel along the imaginary displacement axis.

The known four guidance rails are grouped into two pairs, the guidance rails grouped into a pair being at a shorter distance from one another than the guidance rails of different groups.

The four guidance rails of the known pipetting apparatus lie in one plane and are oriented identically. On each of the four guidance rails, the bearing components guided movably thereon are arranged on the side facing toward the pipetting channel, which facilitates attachment of the disclosed plurality of pipetting channels.

Although this is not explicitly disclosed in EP 2 410 342 A2, it is to be assumed that each pipetting channel is guided on one guidance rail of each pair group, and furthermore that pipetting channels adjacent along the displacement axis are guided displaceably on different guidance rails.

A fundamental problem that exists with pipetting apparatuses of the species is that of embodying the individual pipetting channels to be as slender as possible, so that the metering openings or channel axes of pipetting channels directly adjacent along the displacement axis have a spacing along the displacement axis of no more than 9 mm. The result is that the individual pipetting channels become very slender in the direction of the displacement axis compared with their dimension along the channel axis, which is several times their dimension along the displacement axis. As a rule, the dimension of the bearing components along the displacement axis is greater than the dimension of the pipetting channels themselves in the same direction, which necessitates the use of more than two guidance rails so that pipetting channels directly adjacent along the displacement axis can be brought to within the requisite 9 mm from one another despite the large dimension of the bearing components along the displacement axis as compared with their own dimension.

The dimensions of a pipetting channel (slender along the displacement axis but protruding along the channel axis) result in problems with displaceable bearing support of the pipetting channels, since the distance of the bearing components orthogonally to the displacement axis is very long compared with their bearing length along the displacement axis. Acceleration of the pipetting channel along the displacement axis during operation can result in acceleration moments, which act around a moment axis orthogonal both to the channel axis and to the displacement axis and which lead to dynamic bearing forces that must be braced at the bearing components. With the known pipetting apparatus, short-term motion disruptions can occur here, for example due to jamming, even when bearing components guided with rolling elements on the respective linear guidance rails are used, so that operation of the pipetting apparatus either is disrupted or must proceed more slowly than desired.

The object of the present invention is to improve the pipetting apparatus recited previously in such a way that the aforementioned disadvantages are decreased or even eliminated.

This object is achieved in accordance with the present invention by a pipetting apparatus of the species in which the first and the second bearing component are arranged with a spacing from one another along the displacement axis.

The result of modifying the arrangement of the bearing components that are displaceable along the displacement axis together with a given pipetting channel, in such a way that those two bearing components are arranged with a spacing from one another along the displacement axis, is that the bearing length in the direction of the displacement axis which is achieved at the bearing support of the pipetting channel is greater than is the case with the previously known bearing supports, in which the two bearing components that support a given pipetting channel are always arranged at the same position along the displacement axis. By way of the resulting increase in bearing length, it is possible to avoid disruptive "drawer effects" that are known in the context of actuation of drawers that are short in an opening direction but wide in relation thereto orthogonally to the opening direction. Such drawers often jam repeatedly while being pulled out or inserted.

The guidance frame of the pipetting apparatus according to the present invention is to be embodied to be longer along the displacement axis, by an amount approximately equal to the spacing between the first and the second bearing component, than the actually usable displacement path of the pipetting channel along the displacement axis, but that slightly larger space requirement is more than made up for by the higher accelerations and displacement speeds along the displacement axis which are made possible by the improved support of the pipetting channel. The pipetting channel can thus be moved along the displacement axis in highly accelerated fashion and at high speed, which leads to a considerable productivity advantage over the operating life of the pipetting apparatus. In principle, the first and/or the second bearing component of the present invention can be a bearing component displaceable along the displacement axis with plain bearing support on the linear guidance rail. In the interest of particularly low friction, it is preferred to support the first and/or the second bearing component on the linear guidance rail using rolling elements, for example using recirculating balls.

A "linear guidance rail" for purposes of the present invention is any component that guides a bearing component to move along the displacement axis. Preferably the first and/or the second bearing component wraps around the linear guidance rail, so that the first and/or the second bearing component preferably rides on the linear guidance rail associated with the respective bearing component. Alternatively, however, the linear guidance rail can also wrap around the bearing component associated with it, so that the bearing component can be received in movably guided fashion in a groove of the linear guidance rail, for example if, for reasons of available installation space, the bearing component is not intended to project orthogonally to the displacement axis beyond the linear guidance rail.

In order to reduce the number of different components required for manufacturing the pipetting apparatus, the first and the second bearing component are preferably identical bearing components and are embodied substantially identically. The same applies to the linear guidance rails that guide the bearing components. These too are preferably embodied substantially identically.

Be it noted that the identical physical embodiment of a component is to be considered in the present case separately from the arrangement of physically identically embodied components relative to one another. As will be explained in further detail below, it is on occasion advantageous for the present invention if, in order to avoid an unnecessarily large number of different components, components are embodied physically identically but are arranged in different ways relative to one another on the pipetting apparatus or in particular on the guidance frame.

Although this is not obligatorily necessary, in order to obtain dynamic bearing forces that are as identical as possible in magnitude at the two bearing components it is advantageous if the spacing of the first bearing component from the pipetting channel along the displacement axis, and the spacing of the second bearing component from the pipetting channel along the displacement axis, are of equal magnitude. The first bearing component then protrudes from the pipetting channel along the displacement axis in the one direction exactly as far as the second bearing component does in the opposite direction.

It can nevertheless be advantageous in some circumstances, for example if the acceleration force exerted by a motion drive on the pipetting channel engages on the displaceable pipetting channel at a sufficient distance from the center of gravity thereof and thus generates a dynamic moment, if the spacing of the pipetting channel from one bearing component is greater than from the other bearing component. It is even possible to select a configuration in which the pipetting channel is always located at the same point along the displacement axis, i.e. in this case at the same displacement axis coordinate, as one of the two bearing components, and only the respective other bearing component is provided at a spacing from the pipetting channel along the displacement axis.

In addition or alternatively to the solution recited above, the object on which the present invention is based can also be achieved in that the first and the second bearing component are arranged with an offset from one another along an offset axis that is orthogonal to the displacement axis and is different from a distance axis that proceeds in the direction of the shortest distance between the first and the second linear guidance rail.

The result of this feature is in turn that a bearing support dimension, this time in the direction of the offset axis, is increased by an amount equal to the offset magnitude, which stabilizes the displaceable bearing support of the pipetting channel on the guidance frame along the displacement axis.

The working plane of the pipetting apparatus according to the present invention will be utilized here in order to simplify the description of that apparatus. The "working plane" is that plane of a pipetting apparatus on which containers at which pipetting operations are to be performed are furnished. A pipetting channel is usually movable in a plane parallel to the working plane so that different containers can be arrived at, and is movable orthogonally to the working plane so that it can dip into and retract from a container that is furnished. The aforesaid displacement axis is a motion direction parallel to the working plane. The working plane therefore serves hereinafter as a reference plane for describing the pipetting apparatus and the movabilities and extents implemented thereon.

As a rule, the pipetting channel protrudes from the two linear guidance rails substantially in a prominent direction, so that upon acceleration of the pipetting channel it is necessary to brace at the bearing components not only a dynamic moment around a moment axis that is orthogonal to the aforementioned displacement axis and parallel to the working plane of the pipetting apparatus, but also a dynamic moment around a second moment axis orthogonal to the working plane. This latter bracing is improved by the above-described offset. Jams or motion disruptions in the motion guidance of the pipetting channel for displacement along the displacement axis, which occur as a result of the second aforesaid dynamic moment, can also thereby be minimized or in fact entirely eliminated.

In the present Application, the term "dynamics" is to be understood principally as the theory of forces and moments produced by motion, and of motion produced by forces and moments.

The offset axis is preferably nonparallel to the channel axis. The offset axis is by preference orthogonal to the channel axis. The offset axis, the displacement axis, and the channel axis thus preferably constitute three linearly mutually independent axes, respectively orthogonal pairwise to one another, of a Cartesian coordinate system, of which the offset axis and the displacement axis preferably proceed parallel to the working plane of the pipetting apparatus.

Because the spacing of the bearing components along the displacement axis is more critical, in terms of avoiding an undesired "drawer effect," than the offset of the bearing components along the offset axis, the magnitude of the offset between the first and the second bearing component along the offset axis is preferably less than the spacing between the first and the second bearing component along the displacement axis. In order to limit the additional installation space required for the guidance frame due to the arrangement of the bearing components with a spacing from one another along the offset axis, provision is furthermore preferably made that the spacing between the first and the second bearing component is quantitatively smaller than the distance of the first and the second linear guidance rail from one another.

In order to allow the aforementioned advantageous accessibility of any point within the working plane of the pipetting apparatus to be ensured, according to a preferred refinement of the present invention it is conceivable for the guidance frame to be movable along a movement axis that is both nonparallel to the displacement axis and also nonparallel to the channel axis. The movement axis is preferably orthogonal both to the displacement axis and to the channel axis. The movement axis is then parallel to the offset axis.

The guidance frame can therefore itself in turn be supported movably along the movement axis relative to an apparatus frame, on a linear guidance device that is known per se.

A pipetting channel is preferably drivable to move in each of its possible mutually independent linear motion directions independently of a motion in the respective other motion directions.

In order to reduce the number of different components in the pipetting apparatus, preferably the first and the second bearing component are embodied identically. Also preferably, however, they are not provided in identically oriented fashion on the guidance frame. Preferably the first and the second bearing component are arranged relative to one another
- either rotated 180° around a rotation axis that is orthogonal to the displacement axis and parallel to the working plane of the pipetting apparatus;
- or rotated 180° around a rotation axis parallel to the displacement axis.

For example, the one bearing component from among the first and the second bearing component can thus be arranged in upright fashion on the guidance rail associated with it. The respective other bearing component can be arranged in suspended fashion on the other guidance rail associated with it. The bearing support of the pipetting channel can thus absorb oppositely directed forces outstandingly well, since one bearing component can always be arranged so that the respectively occurring force acts as a compressive force that pushes the bearing component toward the linear guidance rail that guides it. This preferably applies to oppositely directed forces whose force action direction is oriented orthogonally to the working plane recited above as a reference plane.

In order to couple the first and the second bearing component to one another for displacement motion together along the displacement axis, the pipetting apparatus can comprise a retaining arrangement which connects the first and the second bearing component to one another and at which the pipetting channel is received shiftably along its channel axis.

As explained previously, the bearing support of the pipetting apparatus for motion along the displacement axis makes possible very high accelerations and motion speeds. To allow this advantage to be utilized, the pipetting apparatus preferably comprises a linear-motor drive system for displacing the pipetting channel. This can be implemented physically by the fact that the guidance frame comprises a stator of a linear motor having a magnet arrangement, and the retaining arrangement comprises a rotor of the linear motor having a coil arrangement. The stator having the magnet arrangement likewise proceeds along the displacement axis. Current can flow through the coil arrangement.

For maximum independence from an energy supply, the magnet arrangement preferably encompasses a series of permanent magnets that are arranged along the displacement axis with alternating polarity successively to one another. The permanent magnets are preferably polarized in such a way that their one pole faces toward the route to be traveled by the rotor, and its oppositely located other pole faces away from that route.

In order to achieve locally high field strengths in the route traveled by the rotor, particularly preferably the magnet arrangement comprises a yoke arrangement in which two parallel rows of permanent magnets proceeding along the displacement axis are arranged at a distance from one another with a gap spacing. The rotor, associated with that stator, of the pipetting channel travels in the gap formed between the two rows of permanent magnets. In this yoke arrangement, unlike magnetic poles are preferably located opposite one another in a gap spacing direction, so that field lines of the magnet arrangement pass as orthogonally as possible through the gap traveled through by the rotor. Here as well, permanent magnets having an alternating pole arrangement are disposed in each of the parallel magnet arrangements. The stator therefore preferably has a U-shaped cross section in a section plane orthogonal to the displacement axis, each one of the two parallel magnet arrangements being respectively arranged on a free limb of the U-profile.

For synchronous performance of pipetting tasks, the pipetting apparatus preferably comprises a further pipetting channel that extends along a further channel axis parallel to the channel axis of the pipetting channel. To allow the pipetting channel and the further pipetting channel to be brought as close as possible to one another along the displacement axis, the guidance frame preferably comprises a third and a fourth linear guidance rail that proceed parallel to one another along the displacement axis and are provided at a distance from one another. The third and the fourth linear guidance rail are different from the first and the second linear guidance rail but parallel thereto. The further pipetting channel is then guided displaceably along the displacement axis with a third bearing component on the third linear guidance rail and with a fourth bearing component on the fourth linear guidance rail. To allow the above-described advantage of stable bearing support to be achieved for the further pipetting channel as well, the third and the fourth bearing component are arranged with a spacing from one another along the displacement axis.

In principle, the statements made above regarding the pipetting channel also apply mutatis mutandis to the further pipetting channel, provided that the third linear guidance rail takes the place of the first linear guidance rail, the fourth linear guidance rail takes the place of the second linear guidance rail, the third bearing component takes the place of the first bearing component, and the fourth bearing component takes the place of the second bearing component.

The spacing between the third and the fourth bearing component along the displacement axis is preferably equal in magnitude to the spacing between the first and the second bearing component along the displacement axis. The pipetting channel and the further pipetting channel can then be brought as close as possible to one another; the bearing components can have a greater dimension along the displacement axis than the pipetting components themselves, since the bearing components of the pipetting channel and the bearing components of the further pipetting channel are guided on different linear guidance rails and thus cannot collide with one another.

Preferably, all the bearing components of the guidance frame are of identical construction.

In order to obtain dynamic conditions at the pipetting channel and at the further pipetting channel which are as similar as possible, the distance between the first and the second guidance rail is equal in magnitude to the distance between the third and the fourth guidance rail.

In order to ensure identical motion and bearing-support conditions at the pipetting channel and the further pipetting channel, it is likewise preferred if the distance between the first and the third guidance rail is equal in magnitude to the distance between the second and the fourth guidance rail; and that the distance between the first and fourth guidance rail is equal in magnitude to the distance between the second and the third guidance rail. This can be achieved in physically simple fashion, for example, by the fact that the first to fourth guidance rails form edges of an enveloping peripheral surface of a cuboid. In this case the shortest distance between the first and the second linear guidance rail is preferably oriented obliquely to the working plane, so that the first and the second guidance rail (like the third and the fourth guidance rail, if present) on the one hand are distant from one another in a direction orthogonal to the working plane and on the other hand are also distant from one another in a direction parallel to the working plane and orthogonal to the displacement axis. A compact arrangement of the guidance rails is obtained when on the one hand the first and the fourth linear guidance rail, and on the other hand the third and the second linear guidance rail, are respectively arranged exactly below one another in a direction orthogonal to the working plane, and when on the one hand the first and the third linear guidance rail, and on the other hand the second and the fourth linear guidance rail, are respectively arranged exactly alongside one another in a direction parallel to the working plane. This results in the aforementioned arrangement of the linear guidance rails at the edge lines of an enveloping peripheral surface of an imaginary cuboid.

The distance between the rails arranged one above another in a direction orthogonal to the working plane is preferably greater than the distance between linear guidance rails arranged alongside one another parallel to the working plane.

Analogously to the pipetting channel, the further pipetting channel can comprise a further retaining arrangement which connects the third and the fourth bearing component to one another and at which the further pipetting channel is received shiftably along its further channel axis. This results in substantially identical rigidity values for the functional units (pipetting channel and further pipetting channel) that are displaceable along the displacement axis.

In order to facilitate manufacture and installation of the pipetting apparatus, the retaining arrangement and the further retaining arrangement can each comprise a carrier arrangement that connects to one another two bearing components guided on different guidance rails, and can comprise a shifting arrangement, embodied separately from the carrier arrangement and connected thereto for displacement motion together, on which the respective pipetting channel is received shiftably along the channel axis. The carrier arrangement couples to one another the two bearing components belonging to a respective pipetting channel, and enables attachment of a shifting arrangement thereto.

Because the shifting arrangements, together with a control apparatus that, as a rule, is common to all the functional units (pipetting channel and further pipetting channel), make a substantial contribution to the shiftability of the functional units along the respective channel axis, it is advantageous specifically with a view to use of a common control apparatus if the shifting arrangements of the retaining arrangement and of the further retaining arrangement are embodied substantially identically and are arranged with an identical orientation relative to the guidance frame. Because of the identical embodiment and also the identical orientation relative to the guidance frame it is possible, for example, to use the same control algorithms for all the shifting arrangements.

The carrier arrangements of the pipetting channel and further pipetting channel can likewise be embodied identically, which further reduces the number of different components needed for manufacture of the pipetting apparatus. It can then be sufficient simply to arrange the physically identically embodied carrier arrangements with different orientations relative to one another for the pipetting channel on the one hand and the further pipetting channel on the other hand.

Preferably the carrier arrangements of the retaining arrangement on the one hand and of the further retaining arrangement on the other hand are arranged relative to one another
rotated 180° around a rotation axis orthogonal to the displacement axis and parallel to the working plane of the pipetting apparatus;
and/or rotated 180° around a rotation axis orthogonal to the working plane of the pipetting apparatus.

This is possible, for example, when the four guidance rails proceed along the edges of a cuboid, as discussed above. The pipetting channel is then guided on the one pair of linear guidance rails located diagonally opposite one another through the imaginary cuboid, and the further pipetting channel on the respective other pair of diagonally oppositely located linear guidance rails.

The above definition of the relative mutual arrangement of the carrier arrangements of the retaining arrangement on the one hand and the further retaining arrangement on the other hand applies to the preeminently preferred case in which, as discussed above, the four guidance rails proceed along the edges of the enveloping peripheral surface of a cuboid, and two sides of the enveloping peripheral surface of the cuboid are oriented parallel to the working surface, and two further sides thereof orthogonally to the working surface.

For the much less preferred case in which none of the four sides of the enveloping peripheral surface of the imaginary cuboid defined by the four linear guidance rails is oriented parallel or orthogonally to the working surface, the carrier arrangements of the retaining arrangement on the one hand and of the further retaining arrangement on the other hand can nonetheless be configured as identical parts if they are arranged relative to one another rotated 180° around a rotation axis orthogonal to a pair of parallel sides of the enveloping peripheral surface of the imaginary cuboid defined by the four linear guidance rails. The orientation of the working plane relative to the linear guidance rails is then immaterial.

The carrier arrangement preferably comprises, between connecting configurations for connection to the respective bearing components, an arrangement configuration for arranging a shifting arrangement thereon. This arrangement configuration is preferably symmetrical in a manner that is invariant with respect to a 180° rotation around one of the rotation axes recited above in conjunction with the carrier arrangements, so as always to enable attachment of a shifting arrangement in the same orientation relative to the guidance frame, regardless of the respective orientation of the carrier arrangement guided on the linear guidance rails. When considering the completely installed pipetting apparatus, the spacing orthogonally to the working plane between two linear guidance rails guiding a given carrier arrangement is preferably less than the spacing between the connecting configurations of the carrier arrangement for connecting the latter to the two bearing components that guide it. This makes possible, for example, the arrangement of at least one stator of a linear-motor displacement drive in the region between each two guidance rails arranged with a spacing from one another in a direction orthogonal to the working plane. The at least one stator is preferably arranged inside the imaginary cuboid defined by the guidance rails.

In order also to allow the further pipetting channel to be driven with high acceleration and at high speed for motion along the displacement axis, the guidance frame therefore preferably encompasses a further stator of a further linear motor having a further magnet arrangement. The further retaining arrangement encompasses a further rotor of the linear motor having a further coil arrangement. This further stator also proceeds along the displacement axis and is arranged orthogonally to the displacement axis with a spacing from the aforementioned stator.

Once again, on the one hand the stator having the magnet arrangement, and on the other hand the further stator having the further magnet arrangement, are preferably embodied substantially identically. In particular, both stators are embodied as a yoke having the U-shaped cross section described above; for simplified installation of the pipetting apparatus, the stators are then preferably arranged so that the gaps of the stators are arranged in coplanar fashion with each two mutually oppositely located rows of magnets, the stator and the further stator preferably facing toward one another at the yoke opening and away from one another at the yoke base.

Preferably both the stator and the further stator are arranged in the region between each two guidance rails arranged with a spacing from one another in a direction orthogonal to the working plane, particularly preferably inside the imaginary cuboid defined by the guidance rails.

The use of identical parts to embody the stator and further stator is possible, for example, due to the fact that the stator and the further stator are arranged in their orientation relative to one another
  either rotated 180° around a rotation axis that is orthogonal to the displacement axis and parallel to a working plane of the pipetting apparatus on which containers for pipetting operations are furnished;
  or rotated 180° around a rotation axis parallel to the displacement axis.

This statement as well applies to the preferred case in which the four linear guidance rails define the edges of an enveloping peripheral surface of a cuboid, and two sides of the enveloping peripheral surface are oriented parallel to the working plane. With any orientation of the enveloping peripheral surface, the stator and the further stator, constituting identical parts, can be arranged in their orientation relative to one another rotated 180° around a rotation axis orthogonal to one pair of parallel sides of the enveloping peripheral surface of the cuboid.

Both orientations relative to one another, defined by relative rotation, are possible. Depending on the configuration of the magnet arrangement of the respective stator or further stator, the two different relative arrangements are not distinguishable from one another. This is true, for example, if the stator and further stator are embodied mirror-symmetrically with reference to a longitudinal center plane orthogonal to the proceeding direction.

The rotor of the linear motor, which is coupled to the pipetting channel for displacement together along the displacement axis, can represent a problem here. The same is true of the further rotor of the further pipetting channel. As a rule, a rotor (and a further rotor) comprises a plurality of coils, preferably at least three coils, that are arranged successively to one another along the proceeding axis. Theoretically the coils can at least partly overlap, but in order to achieve the thinnest possible rotor it is advantageous if the coils are arranged completely alongside one another, i.e. successively to one another along the proceeding axis when the pipetting apparatus is completely installed. The dimension of a rotor along the proceeding axis is then, however, as a rule greater than the dimension of the pipetting channel coupled to the rotor for motion together. The same applies to the further pipetting channel.

In order to increase the proportion of identical parts in the context of manufacture of the pipetting apparatus, once again on the one hand the rotor having the coil arrangement, and on the other hand the further rotor having the further coil arrangement, are preferably embodied physically identically. In order nevertheless to avoid a collision of the rotors as a result of the aforementioned dimensions as the pipetting channel and the further pipetting channel approach one another along the proceeding axis, and thereby to allow the pipetting channel and the further pipetting channel to come closer to one another, the rotor and further rotor are preferably arranged in their orientation relative to one another rotated 180° around a rotation axis that is orthogonal to the displacement axis and parallel to the working plane, or very generally around a rotation axis orthogonal to a pair of parallel sides of the enveloping peripheral surface, defined by the linear guidance rails, of the cuboid.

The carrier arrangement thus preferably comprises an installation configuration for attachment of a rotor.

Because the relative orientation of the rotor and further rotor with respect to one another corresponds to the orientation of the carrier arrangement and further carrier arrangement, in order to simplify installation of the pipetting apparatus according to the present invention each rotor or each rotor component is preferably installed in identical fashion onto a carrier arrangement. The orientation of the carrier arrangement relative to the guidance frame then determines whether the installed rotor component is a rotor or a further rotor, depending on whether it interacts with the stator or with the further stator in order to generate an electromagnetic accelerating force.

Each rotor or further rotor is coupled via a plurality of electrical leads to different phases of a voltage source, and has control applied to it by the aforementioned control apparatus. The control apparatus can be a computer or a stored-program control system. Because the control apparatus can cause current to flow through the rotor and the further rotor separately from one another, the pipetting channel and the further pipetting channel are displaceable mutually independently along the displacement axis.

The pipetting apparatus according to the present invention described here can comprise more than just one pipetting channel and can comprise more than just one further pipetting channel. The number of simultaneously executable pipetting operations rises with an increasing number of functional units in the form of pipetting channels and further pipetting channels. The pipetting apparatus can therefore preferably comprise a plurality of functional units in the form of pipetting channels and further pipetting channels. In order to allow the functional units to approach as closely to one another as possible (an approach distance of at least 9 mm between the channel axes of adjacent functional units being desired here), it is the case that, with the exception of the end-located functional units for a plurality of functional units, one pipetting channel is arranged between two further pipetting channels, and one further pipetting channel between two pipetting channels, along the proceeding axis. This preferably applies to all other functional units with the exception of the end-located functional units, i.e. with the exception of the pipetting channel or further pipetting channel that is respectively first and last along the displacement axis, depending on whether the pipetting apparatus comprises an even or odd number of functional units (pipetting channels and further pipetting channels).

The present invention will be explained in more detail below with reference to the appended drawings, in which.

In FIGS. 1 to 6, an embodiment according to the present invention of a pipetting apparatus of the present Application is labeled in general with the number 10.

Figure 1:
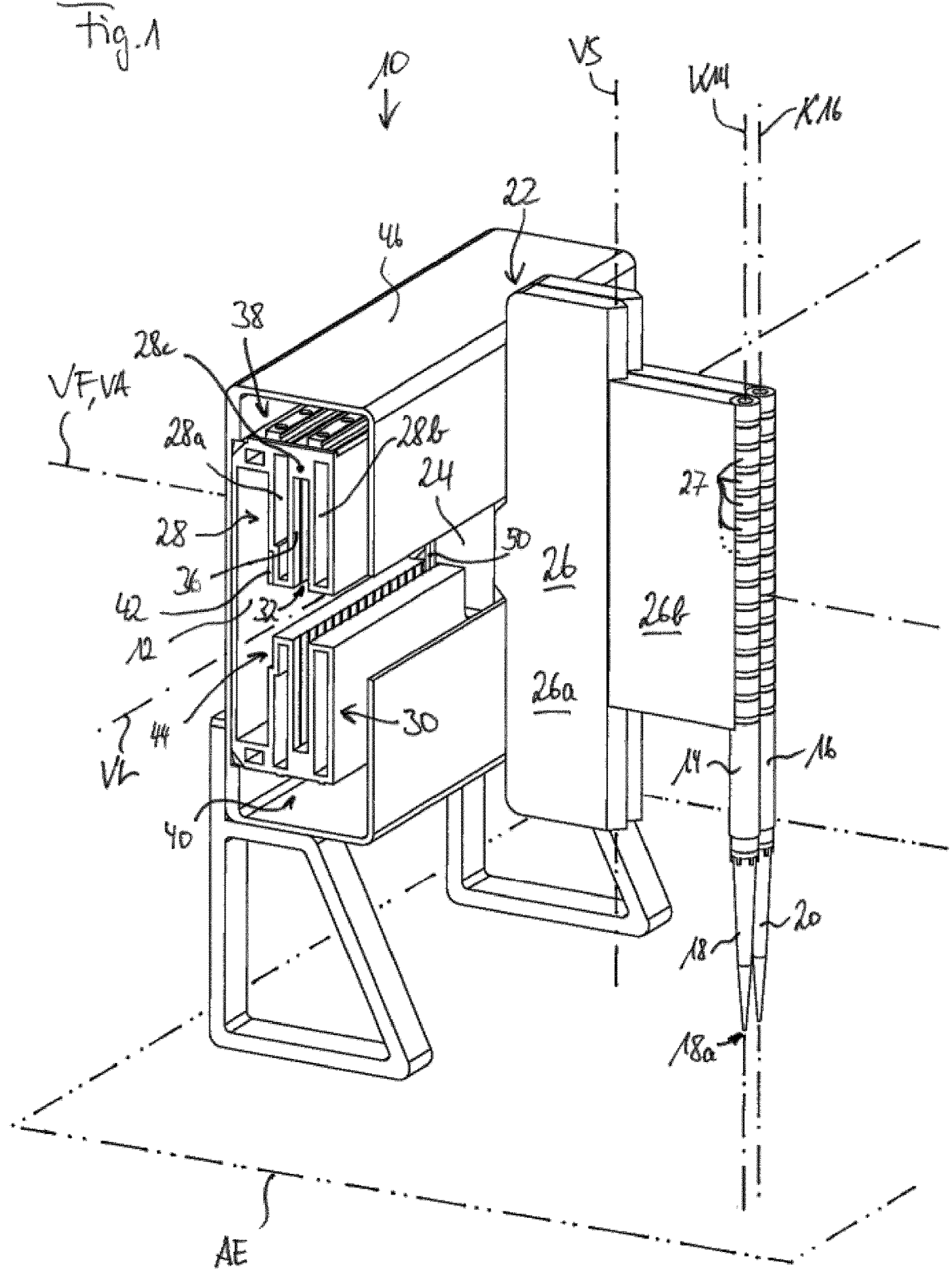
FIG. 1 is a schematic perspective view from the front and above of an embodiment according to the present invention of a pipetting apparatus.

Pipetting apparatus 10 encompasses a guidance frame 12 on which pipetting channels 14 and 16, shown in FIG. 1, are supported movably along a displacement axis VL. Pipetting channels 14 and 16 are embodied substantially identically, so that statements below regarding one pipetting channel apply to all pipetting channels shown in the present embodiment.

Pipetting tips 18 and 20 can be detachably received in known fashion on the respective pipetting channels 14 and 16.

Pipetting channels 14 and 16 extend along respective channel axes K14 and K16 that are preferably oriented orthogonally to displacement axis VL.

Containers from which liquids can be received into pipetting tips 18 and 20, or into which liquids can be delivered from pipetting tips 18 and 20, which usually are not depicted in the Figures and do not belong to the pipetting apparatus, are furnished on a working plane AE that, in the present embodiment, is indicated with dot-dash lines. For aspiration or dispensing of liquids, the pressure of a working medium, as a rule air, in pipetting channels 14 and 16 is modified in a manner known per se in order thereby, by way of the negative pressure or overpressure thereby generated relative to the pressure of the surrounding atmosphere, to aspirate liquid into or eject it out of the respective pipetting tip 18 and/or 20.

In the present example, working plane AE is parallel to displacement axis VL and orthogonal to channel axes K14 and K16.

Figure 6:
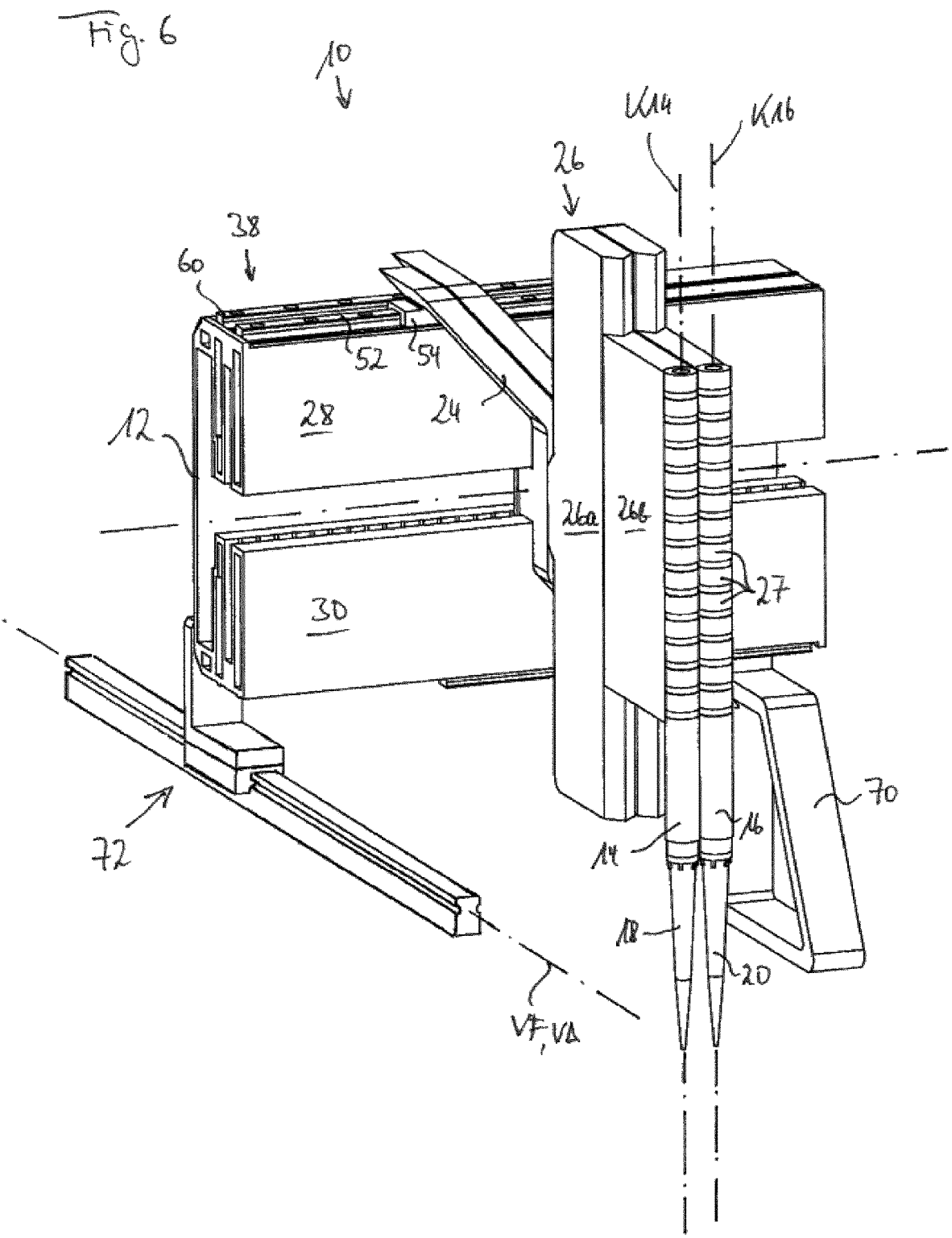
FIG. 6 shows the pipetting apparatus of FIG. 3, having an alternatively depicted linear guidance arrangement for also moving the pipetting channels in the direction of the movement axis.

Pipetting apparatus 10 can additionally be arranged movably along a movement axis VF that is likewise parallel to working plane AE but is orthogonal to displacement axis VL, as indicated e.g. in FIG. 6 at the left end therein of guidance frame 12. Pipetting channels 14 and 16 can then arrive at any desired point on working plane AE in the context of their motion ranges along motion axes VL and VF parallel to working plane AE. In order not to collide with containers furnished on working plane AE when moving parallel thereto, but still to be able to dip into them, pipetting channels 14 and 16 are shiftable along shifting axes VS parallel to the respective channel axes K14 and K16. Motion axes VL, VF, and VS thus constitute mutually linearly independent motion axes of a Cartesian coordinate system, so that a metering opening 18a of a pipetting tip 18 can travel, in the context of the respective motion ranges associated with the motion axes, to any point in the motion space spanned by motion axes VL, VF, and VS. The statements made for pipetting tip 18 apply correspondingly to the metering openings of further pipetting tips 20, etc.

Pipetting channel 14, and moreover all further pipetting channels 16, etc., of the present pipetting apparatus 10 is received on guidance frame 12 displaceably along displacement axis VL by way of a retaining apparatus 22. In the exemplifying embodiment depicted, retaining apparatus 22 encompasses a carrier component 24 that is guided on guidance frame 12 displaceably along displacement axis VL, and a shifting arrangement 26 connected to the carrier arrangement for displacement motion together along displacement axis VL. Shifting arrangement 26 encompasses a carrier arrangement-mounted first component 26a and a second component 26b movable relative thereto on first component 26a along shifting axis VS. Second component 26b can be guided on first component 26a in a manner known per se for motion along shifting axis VS, for example by means of a linear guidance device extending along shifting axis VS, and can furthermore be driven in a manner known per se for the shifting motion, for example by means of a spindle drive or a linear motor. The motion drive for relative motion of second component 26b relative to first component 26a along shifting axis VS can be received in first component 26a; the control system necessary therefor can likewise be received partly or entirely in first component 26a. Second component 26b can partly or entirely comprise the devices necessary for modifying the pressure of the working medium in the associated respective pipetting channel, for example a corresponding control system. Pipetting channel 14 can comprise, for example, a ferromagnetic and preferably permanently magnetized piston that can be driven by coils 27, concentric with the respective channel axis K14, K16, etc., for motion along channel axis K14 in a pipetting channel tube. The application of current to drive coils 27 can be controlled by the control system received in first component 26a and/or in second component 26b.

Pipetting channels 14, 16, etc. are driven to move along displacement axis VL in linear-motor fashion, which makes possible high accelerations with correspondingly large dynamic reaction forces. As a result, the productivity of such pipetting apparatuses is extraordinarily high.

Guidance frame 12 therefore comprises at least one stator 28. More precisely, the guidance frame comprises two stators, namely stator 28 and a further stator 30. The two stators are embodied substantially identically and are merely rotated relative to one another and arranged with a spacing from one another. For example, the two stators 28 and 30 can theoretically be transposed into one another by a 180° rotation around a rotation axis parallel to displacement axis VL, or the two stators 28 and 30 can theoretically be transposed into one another by a 180° relative rotation around a rotation axis that is orthogonal to movement axis VF, i.e. orthogonal to displacement axis VL and parallel to working plane AE. The latter is the case in the embodiment depicted. It is therefore sufficient to describe stator 28 below. Assuming the above symmetry condition, the description thereof also applies to stator 30 (theoretical transposition by 180° rotation around a rotation axis parallel to movement axis VF).

Stator 28, as well as stator 30, is preferably embodied integrally with the guidance frame, for example as a hot-extruded plastic profile or continuous-cast aluminum profile.

Stator 28 and/or stator 30 can also be embodied separately from the guidance frame and connected to it using suitable connecting means.

Stator 28 has a U-shaped cross section with its two mutually oppositely located limbs 28a and 28b that are connected to one another by a base 28c. To save weight, limbs 28a and 28b can be embodied as hollow bodies. Constituted between limbs 28a and 28b of the yoke-like stator 28 is a gap 32 in which rotor 34 of (in this case) pipetting channel 16 runs displaceably along displacement axis VL.

Arranged on the mutually facing inner sides of yoke limbs 28a and 28b is a respective magnet arrangement that encompasses a series of alternatingly polarized permanent magnets that follow one another along displacement axis VL. Only magnet arrangement 36, of limb 28a located farther from pipetting channels 14 and 16, is evident in FIG. 1. A further magnet arrangement 37 (see FIG. 3) on limb 28b is located opposite that magnet arrangement 36, in such a way that unlike poles are always located opposite one another in a width direction of gap 32. The permanent magnets of magnet arrangement 36 and of the oppositely located magnet arrangement 37 are arranged in such a way that their polarization direction likewise faces in the width direction of gap 32, i.e. one of the two poles of a permanent magnet is always located in its entirety closer to gap 32, and the respective other, opposite pole is always located in its entirety farther from gap 32. Field lines between magnet arrangements 36 and 37 of the two stator limbs 28a and 28b of yoke-like stator 28 thus pass through gap 32 substantially orthogonally in the latter's width direction, the field direction reversing with each mutually oppositely located permanent-magnet pair in accordance with the sequence of permanent magnets arranged with alternating polarization along displacement axis VL. It is thereby possible to achieve a dense, highly efficient magnetic field in which rotor 34 can be moved very precisely, very quickly, and with high acceleration. The accuracy with which the pipetting channels can be positioned along displacement axis VL further depends on the pole pitch of magnet arrangement 36 and of magnet arrangement 37 located opposite it.

A respective arrangement 38, 40 having a pair of linear guidance rails is arranged on that side of a stator portion of guidance frame 12 which faces away from the respective other stator. Only upper arrangement 38 is depicted in detail in FIG. 1; lower arrangement 40 is merely indicated.

Guidance frame 12 can furthermore comprise a distance scale 42 that serves to detect the position of pipetting channels along displacement axis VL. Scale 42 is preferably an absolute scale, so that the position of a pipetting channel can be ascertained directly. It is not to be excluded, however, that an incremental scale is used instead. Scale 42 is preferably arranged in an attachment configuration 44 into which it fits preferably flush. In the example depicted, attachment configuration 44 for the attachment of distance scale 42 is arranged on that side of limb 28a of stator 28 which faces away from magnet arrangement 36. The same applies to stator 30 given the aforementioned symmetry condition. Attachment configuration 44 could, however, just as easily be embodied on that side of limb 28b which faces away from the magnet arrangements, or at any other point on guidance frame 12.

Because pipetting channels guided on guidance frame 12 for displacement along displacement axis VL cannot overtake one another, it is sufficient to arrange only one distance scale in only one attachment configuration. In the example depicted, guidance frame 12 is surrounded by a shell-shaped enclosure 46 having a C-shaped cross section. Pipetting channels 14, 16, etc. are mechanically connected respectively to rotors 34, 50 through slot 48 of enclosure 46.

Figure 5:
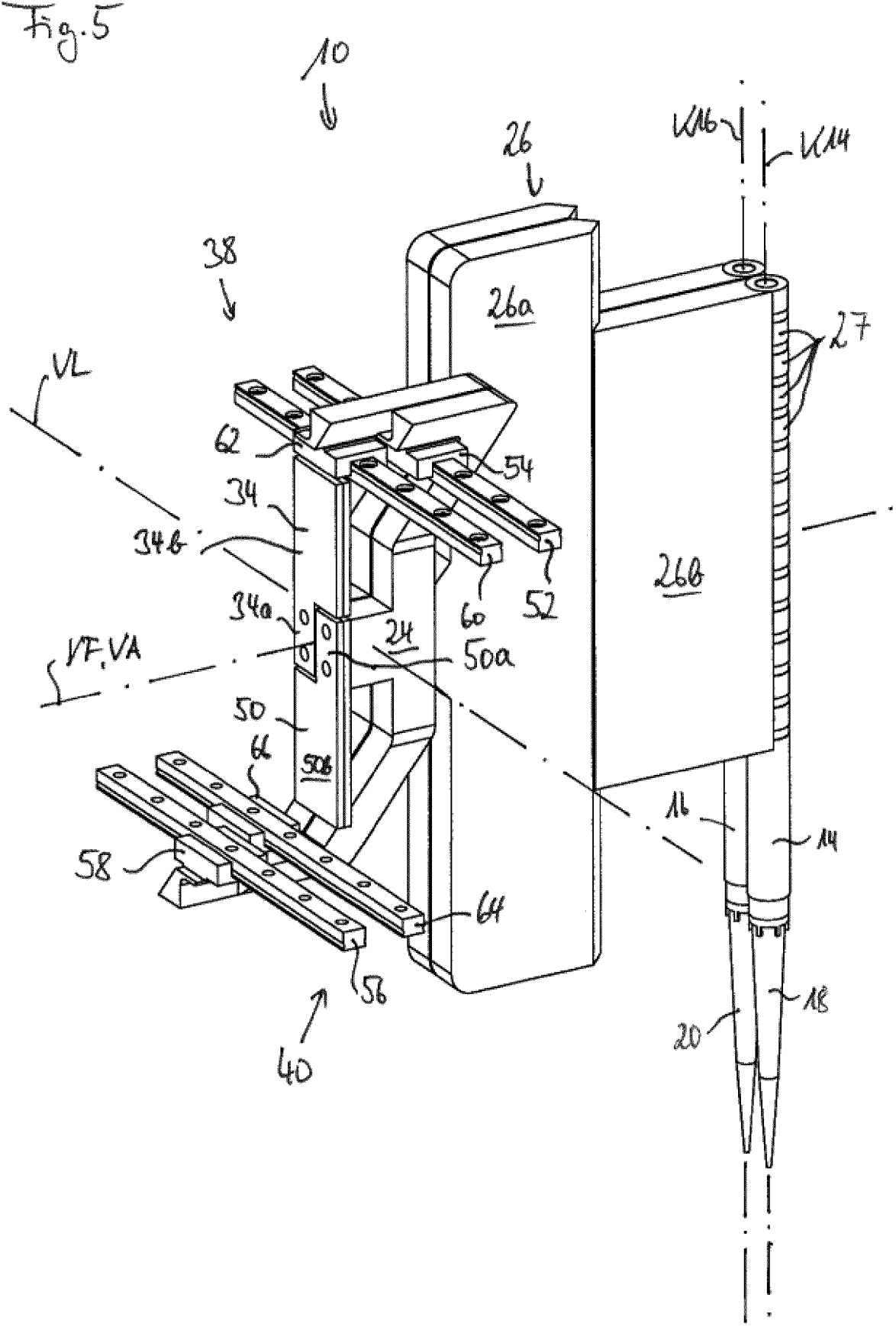
FIG. 5 is a perspective view from the rear and above of what is shown in FIG. 4.

As is particularly evident in FIG. 5, each pipetting channel is guided on two linear guidance rails, specifically on one from among each rail arrangement 38 and 40. Linear guidance rail arrangement 38 comprises a first linear guidance rail 52 on which a bearing component 54 is guided displaceably only along displacement axis VL.

Linear guidance rail arrangement 40 comprises a second linear guidance rail 56 on which a second bearing component 58 is guided displaceably only along displacement axis VL. Bearing components 54 and 58 can be, for example, guidance carriages that have rows of recirculating balls and are guided in low-friction but precise fashion on their respective guidance rails 52 and 56. Pipetting channel 14 is supported by first bearing component 54 and by second bearing component 58 for displacement along displacement axis VL.

First linear guidance rail arrangement 38 comprises a third linear guidance rail 60 on which a third bearing component 62 is guided displaceably only along displacement axis VL. The other linear guidance rail arrangement 40 likewise comprises a fourth linear guidance rail 64 on which a fourth bearing component 66 is guided displaceably only along displacement axis VL. Pipetting channel 16 is guided with third and fourth bearing component 62, 66 respectively on third and fourth linear bearing rail 60, 64 for displacement along displacement axis VL.

Carrier arrangement 24 of pipetting channel 14 wraps around first and second linear guidance rails 52, 56, which also means, given the arrangement of linear guidance rails in the exemplifying embodiment shown, wrapping around fourth linear guidance rail 64. Carrier arrangement 24 of pipetting channel 14 rigidly connects first and second bearing components 54, 58 to one another for motion together along displacement axis VL. As is evident from FIG. 4, which shows guidance rail arrangements 38 and 40, having pipetting channels guided thereon, viewed along movement axis VF, a spacing A along displacement axis VL exists between bearing components 54 and 58 that are connected to the same pipetting channel 14. The guidance length of pipetting channel 14 along displacement axis VL can thereby be increased with no need to embody pipetting channel 14, or retaining arrangement 26 combined with it, to be any wider than necessary for that purpose. Pipetting channel 14 and retaining arrangement 26 do not exceed a value of 9 mm in their dimensions in the direction of displacement axis VL. Spacing A between first and second bearing components 54, 58 of pipetting channel 14, conversely, is equal to several times the dimension of pipetting channel 14, or of its retaining arrangement 26, in the direction of displacement axis VL. The two bearing components 54 and 58 are located at quantitatively equal distances from a plane that contains channel axis K14 of pipetting channel 14 and is orthogonal to displacement axis VL, but are located on different sides of that plane.

Figure 4:
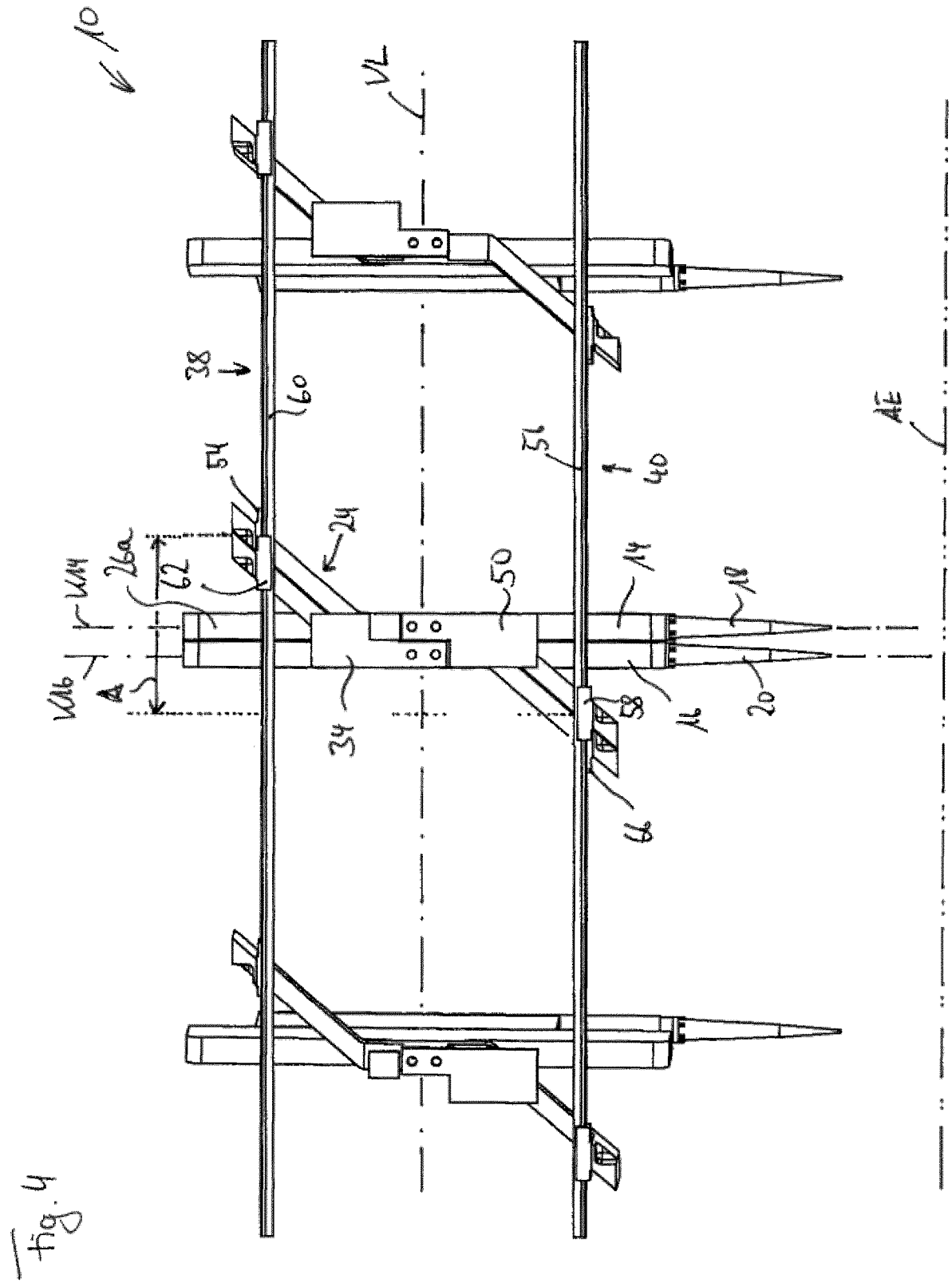
FIG. 4 is a view, looking along the movement axis, of the pipetting apparatus of FIG. 1 but with no guidance frame, only with linear guidance rails and with retaining arrangements and pipetting channels guided thereon by means of bearing components.

The aforesaid plane, based on the perspective of FIG. 4 in which movement axis VF is orthogonal to the drawing plane, is likewise orthogonal to the drawing plane so that it coincides with the line of channel axis K14. Working plane AE is also orthogonal to the drawing plane in FIG. 4.

Because linear guidance rails 52 and 56 that guide first and second bearing components 54 and 58 are offset from one another along an offset axis VA coincident with movement axis VF, bearing components 54 and 58 also exhibit, along that offset axis VA, an offset that enhances the guidance stability of pipetting channel 14 as it moves along displacement axis VL.

Figure 2:
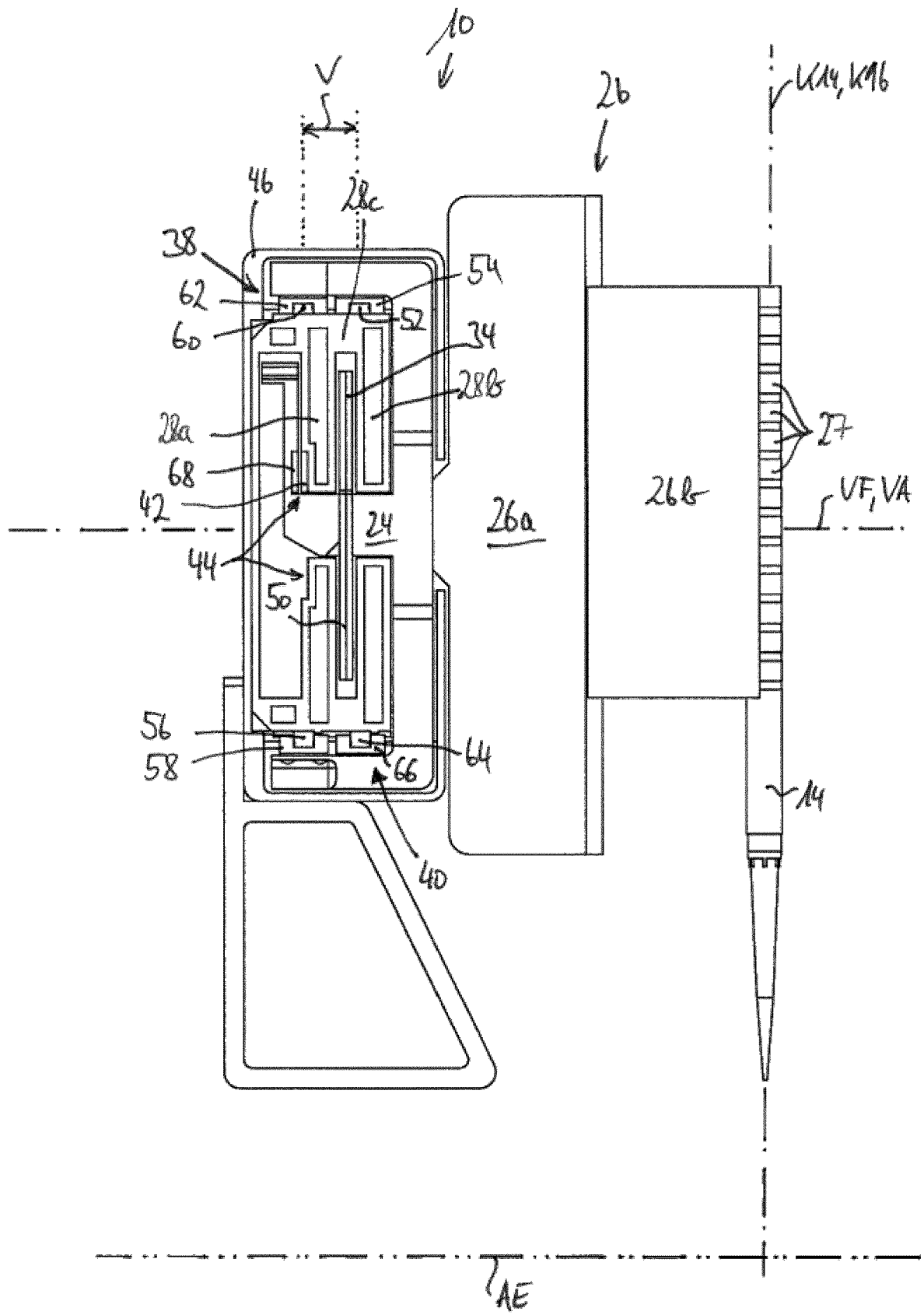
FIG. 2 shows the pipetting apparatus of FIG. 1, looking along the displacement axis.
Figure 3:
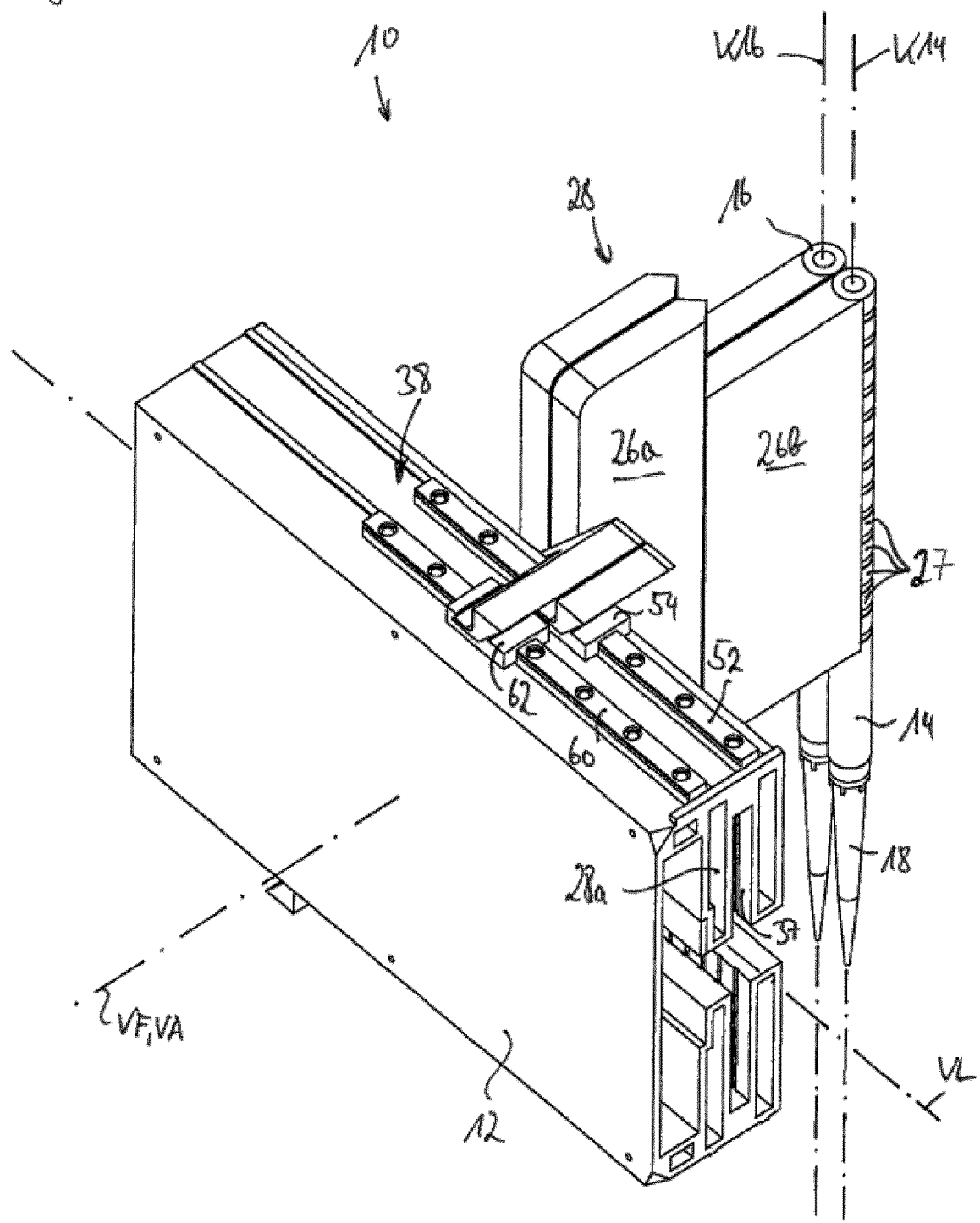
FIG. 3 is a perspective view from the rear and above of the pipetting apparatus of FIGS. 1 and 2, but without an enclosure.

Offset V along offset axis VA between first and second bearing components 54 and 58 is clearly evident in FIG. 2. Displacement axis VL is oriented orthogonally to the drawing plane in FIG. 2, as is working plane AE.

Bearing components 54, 58, 62, and 66 are identical. Linear guidance rails 52, 56, 60, and 64 are also identical to one another. When viewed along displacement axis VL (see FIG. 2), linear guidance rails 52, 56, 60, and 64 form the corners of a rectangle, the spacing between two linear guidance rails orthogonally to displacement axis VL and movement axis VF being greater than along movement axis VF or offset axis VA. Linear guidance rails 52, 56, 60, and 64 thus form the edges of an enveloping peripheral surface of a cuboid. The linear guidance rails of arrangement 38 on the one hand, and the guidance rails of arrangement 40 on the other hand, are arranged symmetrically in such a way that the one arrangement is theoretically transposable into the respective other arrangement by a 180° rotation around a rotation axis parallel to displacement axis VL. The linear guidance rails as well, because of their symmetrical embodiment, are theoretically transposable into one another by a 180° rotation around a rotation axis parallel to movement axis VF.

Carrier arrangements 24 are identically embodied for all the pipetting channels, but not identically arranged. Carrier arrangement 24 of pipetting channel 14 can become a carrier arrangement 24 of pipetting channel 16 by a 180° rotation around a rotation axis parallel to movement axis VF, and vice versa. The bearing components connected to the respective carrier arrangement 24 can participate in that rotation.

Preferably each two pipetting channels directly adjacent to one another along displacement axis VL are guided on a different pair of linear guidance rails. For example, pipetting channel 16 directly adjacent to pipetting channel 14 along displacement axis VL is guided on third linear guidance rail 60 and on fourth linear guidance rail 64 for motion along displacement axis VL. FIG. 4 shows two further pipetting channels, one respectively adjacent to pipetting channel 16 on the side facing away from pipetting channel 14, and one adjacent to pipetting channel 14 on the side facing away from pipetting channel 16. A condition applicable to all pipetting channels of pipetting apparatus 10 which are guided displaceably along displacement axis VL is that two pipetting channels directly adjacent to one another along displacement axis VL are guided on different linear guidance rails, each second pipetting channel always being guided on the same two linear guidance rails. It is thereby possible to configure the bearing components to be longer, in a direction along displacement axis VL, than the pipetting channels supported by them, which means additional guidance length along displacement axis VL.

As FIG. 5 shows, rotors 34 and 50 of two pipetting channels directly adjacent along displacement axis VL are embodied identically, but are not identically arranged on pipetting apparatus 10. They respectively comprise a narrow attachment portion 34a, 50a that is no wider, in the direction of displacement axis VL, than the desired grid spacing between two channel axes, brought maximally close to one another, of two directly adjacent pipetting channels. Rotors 34 and 50 furthermore respectively comprise a coil portion 34b, 50b in which is received a coil arrangement that, when current flow occurs, generates a time-variant magnetic field that interacts with the respective magnet arrangements of stators 28 and 30 and thus brings about an acceleration of the respective pipetting channel along displacement axis VL. Attachment portion 34a and coil portion 34b are L-shaped, so that rotors 34 and 50 of two pipetting channels directly adjacent along displacement axis VL can complement one another to yield a substantially continuous rectangle when brought as close to one another as possible.

A sensor 68, which interacts with distance scale 42 for position determination, can be provided on a carrier arrangement 24 or on a rotor arranged thereon (see rotor 50 in FIG. 4). For reasons of symmetry and in the interest of simplified installation and manufacture associated therewith, guidance frame 12 having stators 28 and 30 embodied integrally thereon is preferably arranged mirror-symmetrically with reference to a mirror symmetry plane parallel to working plane AE. The guidance frame thus comprises two attachment configurations 44 for attaching distance scale 42, even though only one of them is actually needed.

FIG. 2 shows that a carrier arrangement 24, when viewed along displacement axis VL, is in the shape of an E whose upper and lower limbs serve for connection to the bearing components, whose center limb serves for connection to the respective rotor, and whose base that connects the limbs serves for connection to shifting arrangement 26. The center part of the base that connects the three limbs is preferably oriented parallel to channel axis K of the respective pipetting channel connected to the carrier arrangement, whereas an upper and a lower region of the base of carrier arrangement 24 is inclined with respect to the associated channel axis K so that spacing A of the bearing components connected to carrier arrangement 24 can be produced.

FIG. 6 shows on the one hand that the pipetting apparatus does not necessarily require a housing 46 that surrounds guidance frame 12. Guidance frame 12 itself can instead either rest in stationary fashion above a frame 70, or can be guided via a further linear guidance arrangement 72 for motion along movement axis VF. Guidance frame 12 can itself in turn be driven by a linear motor, or mechanically via a spindle drive, for motion along movement axis VF. Guidance frame 12 can of course also be embodied movably with a housing 46 having a linear guidance arrangement 72.

A pipetting apparatus 10 that is highly dynamic, extremely quickly and precisely movable, and thus highly productive, is achieved with the present invention.

The invention claimed is:

1. A pipetting apparatus comprising:
   a guidance frame having a first linear guidance rail and having a second linear guidance rail, the first and the second linear guidance rail proceeding parallel to one another along a displacement axis and being provided at a distance from one another orthogonally to the displacement axis, and having a pipetting channel which extends along a channel axis that is nonparallel to the displacement axis and which is guided displaceably along the displacement axis with a first bearing component on the first linear guidance rail and with a second bearing component on the second linear guidance rail, wherein the first and the second bearing component are arranged with a fixed spacing from one another along the displacement axis.

2. The pipetting apparatus according to claim 1, wherein a second spacing of the first bearing component from the pipetting channel along the displacement axis, and a third spacing of the second bearing component from the pipetting channel along the displacement axis, are of equal magnitude.

3. The pipetting apparatus according to, wherein the first and the second bearing component are arranged with an offset from one another along an offset axis that is orthogonal to the displacement axis and is different from a distance axis that proceeds in the direction of the shortest distance between the first and the second linear guidance rail.

4. The pipetting apparatus according to claim 3, wherein the offset axis is nonparallel to the channel axis.

5. The pipetting apparatus according to claim 3, wherein the magnitude of the offset between the first and the second bearing component along the offset axis is less than the spacing between the first and the second bearing component along the displacement axis.

6. The pipetting apparatus according to claim 1, wherein the guidance frame is movable along a movement axis that is both nonparallel to the displacement axis and nonparallel to the channel axis, a working plane of the pipetting apparatus, on which containers for pipetting operations are furnished, being parallel both to the displacement axis and to the movement axis.

7. The pipetting apparatus according to claim 1, wherein the first and the second bearing component are embodied substantially identically and are arranged relative to one another either rotated 180° around a rotation axis that is orthogonal to the displacement axis and parallel to a working plane of the pipetting apparatus on which containers for pipetting operations are furnished, or rotated 180° around a rotation axis parallel to the displacement axis.

8. The pipetting apparatus according to claim 1 further compromising a retaining arrangement which connects the first and the second bearing component to one another and at which the pipetting channel is received shiftably along its channel axis.

9. The pipetting apparatus according to claim 8, wherein the guidance frame comprises a stator of a linear motor having a magnet arrangement, and the retaining arrangement comprises a rotor of the linear motor having a coil arrangement.

10. The pipetting apparatus according to claim 1, wherein the guidance frame comprises a third and a fourth linear guidance rail that proceed parallel to one another along the displacement axis and are provided at a distance from one another, the pipetting apparatus comprises a further pipetting channel that extends along a further channel axis parallel to the channel axis and is guided displaceably along the displacement axis with a third bearing component on the third linear guidance rail and with a fourth bearing component on the fourth linear guidance rail, and the third and the fourth bearing component are arranged with a fixed spacing from one another along the displacement axis.

11. The pipetting apparatus according to claim 10, wherein the distance between the first and the second guidance rail is equal in magnitude to the distance between the third and the fourth guidance rail.

12. The pipetting apparatus according to claim 10, wherein the distance between the first and the third guidance rail is equal in magnitude to the distance between the second and the fourth guidance rail; and the distance between the first and fourth guidance rail is equal in magnitude to the distance between the second and the third guidance rail.

13. The pipetting apparatus according to claim 10, wherein the further pipetting channel comprises a further retaining arrangement which connects the third and the fourth bearing component to one another and at which the further pipetting channel is received shiftably along its further channel axis.

14. The pipetting apparatus according to claim 13, wherein the retaining arrangement and the further retaining arrangement comprise a carrier arrangement that connects to one another two bearing components guided on different guidance rails, and comprise a shifting arrangement, embodied separately from the carrier arrangement and connected thereto for displacement motion together, on which the respective pipetting channel is received shiftably along the channel axis.

15. The pipetting apparatus according to claim 14, wherein the shifting arrangements of the retaining arrangement and of the further retaining arrangement are embodied substantially identically and are arranged with an identical orientation relative to the guidance frame.

16. The pipetting apparatus according to claim 14, wherein the carrier arrangements of the retaining arrangement and of the further retaining arrangement are embodied substantially identically and are arranged with a different orientation relative to one another.

17. The pipetting apparatus according to claim 16, wherein the carrier arrangements of the retaining arrangement and of the further retaining arrangement are arranged relative to one another rotated 180° around a rotation axis orthogonal to the displacement axis and parallel to a working plane of the pipetting apparatus on which containers for pipetting operations are furnished, and/or rotated 180° around a rotation axis orthogonal to the working plane of the pipetting apparatus.

18. The pipetting apparatus according to claim 10, wherein the guidance frame comprises a further stator of a further linear motor having a further magnet arrangement; and the further retaining arrangement comprises a further rotor of the linear motor having a further coil arrangement.

19. The pipetting apparatus according to claim 18, wherein on the one hand the stator having the magnet arrangement, and on the other hand the further stator having the further magnet arrangement, are embodied substantially identically and are arranged in their orientation relative to one another either rotated 180° around a rotation axis that is orthogonal to the displacement axis and parallel to a working plane of the pipetting apparatus on which containers for pipetting operations are furnished, or rotated 180° around a rotation axis parallel to the displacement axis.

20. The pipetting apparatus according to claim 19, wherein on the one hand the rotor having the coil arrangement, and on the other hand the further rotor having the further coil arrangement, are embodied substantially physically identically and are arranged in their orientation relative to one another rotated 180° around a rotation axis that is orthogonal to the displacement axis and parallel to a working plane of the pipetting apparatus on which containers for pipetting operations are furnished.

21. The pipetting apparatus according to claim 20, wherein on the one hand the carrier arrangement of the retaining arrangement, and on the other hand the further carrier arrangement of the further retaining arrangement, each comprise a rotor and, including that rotor, are embodied substantially identically and are arranged in their orientation relative to one another rotated 180° around a rotation axis orthogonal to the displacement axis and parallel to a working plane of the pipetting apparatus on which containers for pipetting operations are furnished.

22. The pipetting apparatus according to claim 10, further comprising a plurality of functional units in the form of pipetting channels and further pipetting channels, such that along the displacement axis, a plurality of functional units with the exception of end-located functional units, one pipetting channel is arranged between two further pipetting channels, and one further pipetting channel between two pipetting channels.

23. The pipetting apparatus according to claim 1 wherein the pipetting channel which extends along a channel axis that is orthogonal to the displacement axis.

24. The pipetting apparatus according to claim 3, wherein the offset axis is orthogonal to the channel axis.

25. The pipetting apparatus according to claim 1, wherein the guidance frame is movable along a movement axis that is orthogonal to the displacement axis and orthogonal to the channel axis, a working plane of the pipetting apparatus on which containers for pipetting operations are furnished, being parallel both to the displacement axis and to the movement axis.

* * * * *